(12) United States Patent
Budnick (10) Patent No.: US 10,087,843 B2
(45) Date of Patent: Oct. 2, 2018

(54) MOUNT WITH DEFLECTABLE TABS

(71) Applicant: United Technologies Corporation, Hartford, CT (US)

(72) Inventor: Matthew Budnick, Hudson, NH (US)

(73) Assignee: United Technologies Corporation, Hartford, CT (US)

( * ) Notice: Subject to any disclaimer, the term of this patent is extended or adjusted under 35 U.S.C. 154(b) by 430 days.

(21) Appl. No.: 14/655,571

(22) PCT Filed: Dec. 19, 2013

(86) PCT No.: PCT/US2013/076760
§ 371 (c)(1),
(2) Date: Jun. 25, 2015

(87) PCT Pub. No.: WO2014/105657
PCT Pub. Date: Jul. 3, 2014

(65) Prior Publication Data
US 2015/0345399 A1    Dec. 3, 2015

Related U.S. Application Data (60) Provisional application No. 61/747,227, filed on Dec. 29, 2012.

(51) Int. Cl.
*F02C 7/20* (2006.01)
*F01D 25/24* (2006.01)
(Continued)

(52) U.S. Cl.
CPC ............ *F02C 7/20* (2013.01); *F01D 9/041* (2013.01); *F01D 11/005* (2013.01);
(Continued)

(58) Field of Classification Search
CPC .. F02C 7/20; F02C 7/24; F01D 25/162; F01D 25/243; F01D 9/04; F01D 25/28; F01D 9/065
See application file for complete search history.

(56) References Cited

U.S. PATENT DOCUMENTS

| 2,214,108 A | 7/1938 | Nichols |
| 3,576,328 A | 4/1971 | Vose |

(Continued)

FOREIGN PATENT DOCUMENTS

| WO | WO 03/020469 A1 | 3/2003 |
| WO | WO 2006/007686 A1 | 1/2006 |

(Continued)

OTHER PUBLICATIONS

International Searching Authority, PCT Notification of the Transmittal of the International Search Report and the Written Opinion, dated Apr. 21, 2014, 10 pages.

*Primary Examiner* — Logan Kraft
*Assistant Examiner* — Sabbir Hasan
(74) *Attorney, Agent, or Firm* — Kinney & Lange, P.A.

(57) ABSTRACT

An assembly for a gas turbine engine includes a first component, a second component, and a first mount. The first mount includes an annular body that is connected to the first component and a plurality of circumferentially spaced tabs extending from the body. The tabs are connected to the second component and are deflectable to allow the second component to move relative to the first component.

18 Claims, 4 Drawing Sheets

(51) Int. Cl.
    *F01D 9/04* (2006.01)
    *F01D 11/00* (2006.01)
    *F01D 25/16* (2006.01)
    *F02C 7/24* (2006.01)

(52) U.S. Cl.
    CPC ......... *F01D 25/162* (2013.01); *F01D 25/243* (2013.01); *F02C 7/24* (2013.01); *F05D 2260/941* (2013.01); *Y10T 29/49828* (2015.01)

(56) References Cited

U.S. PATENT DOCUMENTS

| | | | |
|---|---|---|---|
| 3,802,046 A | | 4/1974 | Wachtell et al. |
| 3,970,319 A | | 7/1976 | Carroll et al. |
| 4,009,569 A | | 3/1977 | Kozlin |
| 4,044,555 A | | 4/1977 | McLoughlin et al. |
| 4,088,422 A | | 5/1978 | Martin |
| 4,114,248 A | | 9/1978 | Smith et al. |
| 4,305,697 A | | 12/1981 | Cohen et al. |
| 4,321,007 A | | 3/1982 | Dennison et al. |
| 4,369,016 A | | 1/1983 | Dennison |
| 4,478,551 A | | 10/1984 | Honeycutt, Jr. et al. |
| 4,645,217 A | | 2/1987 | Honeycutt, Jr. et al. |
| 4,678,113 A | | 7/1987 | Bridges et al. |
| 4,738,453 A | | 4/1988 | Ide |
| 4,756,536 A | | 7/1988 | Belcher |
| 4,793,770 A | | 12/1988 | Schonewald et al. |
| 4,920,742 A | * | 5/1990 | Nash .............. F01D 25/162 |
| | | | 415/116 |
| 4,987,736 A | | 1/1991 | Ciokajlo et al. |
| 4,989,406 A | | 2/1991 | Vdoviak et al. |
| 4,993,918 A | | 2/1991 | Myers et al. |
| 5,031,922 A | | 7/1991 | Heydrich |
| 5,042,823 A | | 8/1991 | Mackay et al. |
| 5,071,138 A | | 12/1991 | Mackay et al. |
| 5,076,049 A | | 12/1991 | VonBenken et al. |
| 5,100,158 A | | 3/1992 | Gardner |
| 5,108,116 A | | 4/1992 | Johnson et al. |
| 5,169,159 A | | 12/1992 | Pope et al. |
| 5,174,584 A | | 12/1992 | Lahrman |
| 5,188,507 A | | 2/1993 | Sweeney |
| 5,211,541 A | | 5/1993 | Fledderjohn et al. |
| 5,236,302 A | | 8/1993 | Weisgerber et al. |
| 5,246,295 A | | 9/1993 | Ide |
| 5,265,807 A | | 11/1993 | Steckbeck et al. |
| 5,269,057 A | | 12/1993 | Mendham |
| 5,272,869 A | | 12/1993 | Dawson et al. |
| 5,273,397 A | | 12/1993 | Czachor et al. |
| 5,279,127 A | * | 1/1994 | Napoli ................. F02K 1/822 |
| | | | 60/754 |
| 5,292,227 A | | 3/1994 | Czachor et al. |
| 5,312,227 A | | 5/1994 | Grateau et al. |
| 5,338,154 A | | 8/1994 | Meade et al. |
| 5,357,744 A | | 10/1994 | Czachor et al. |
| 5,370,402 A | | 12/1994 | Gardner et al. |
| 5,385,409 A | | 1/1995 | Ide |
| 5,401,036 A | | 3/1995 | Basu |
| 5,438,756 A | | 8/1995 | Halchak et al. |
| 5,474,305 A | | 12/1995 | Flower |
| 5,483,792 A | | 1/1996 | Czachor et al. |
| 5,558,341 A | | 9/1996 | McNickle et al. |
| 5,597,286 A | | 1/1997 | Dawson et al. |
| 5,605,438 A | | 2/1997 | Burdgick et al. |
| 5,609,467 A | | 3/1997 | Lenhart et al. |
| 5,632,493 A | | 5/1997 | Gardner |
| 5,634,767 A | | 6/1997 | Dawson |
| 5,653,580 A | | 8/1997 | Faulder et al. |
| 5,691,279 A | | 11/1997 | Tauber et al. |
| 5,755,445 A | | 5/1998 | Arora |
| 5,851,105 A | | 12/1998 | Fric et al. |
| 5,911,400 A | | 6/1999 | Niethammer et al. |
| 6,163,959 A | | 12/2000 | Arraitz et al. |
| 6,196,550 B1 | | 3/2001 | Arora et al. |
| 6,227,800 B1 | | 5/2001 | Spring et al. |
| 6,337,751 B1 | | 1/2002 | Kimizuka |
| 6,343,912 B1 | | 2/2002 | Mangeiga et al. |
| 6,358,001 B1 | | 3/2002 | Bosel et al. |
| 6,364,316 B1 | | 4/2002 | Arora |
| 6,439,841 B1 | | 8/2002 | Bosel |
| 6,511,284 B2 | | 1/2003 | Darnell et al. |
| 6,578,363 B2 | | 6/2003 | Hashimoto et al. |
| 6,601,853 B2 | | 8/2003 | Inoue |
| 6,612,807 B2 | | 9/2003 | Czachor |
| 6,619,030 B1 | | 9/2003 | Seda et al. |
| 6,638,013 B2 | | 10/2003 | Nguyen et al. |
| 6,652,229 B2 | | 11/2003 | Lu |
| 6,672,833 B2 | | 1/2004 | MacLean et al. |
| 6,719,524 B2 | | 4/2004 | Nguyen et al. |
| 6,736,401 B2 | | 5/2004 | Chung et al. |
| 6,792,758 B2 | | 9/2004 | Dowman |
| 6,796,765 B2 | | 9/2004 | Kasel et al. |
| 6,805,356 B2 | | 10/2004 | Inoue |
| 6,811,154 B2 | | 11/2004 | Proctor et al. |
| 6,935,631 B2 | | 8/2005 | Inoue |
| 6,969,826 B2 | | 11/2005 | Trewiler et al. |
| 6,983,608 B2 | | 1/2006 | Allen, Jr. et al. |
| 7,055,305 B2 | | 6/2006 | Baxter et al. |
| 7,094,026 B2 | | 8/2006 | Coign et al. |
| 7,100,358 B2 | | 9/2006 | Gekht et al. |
| 7,200,933 B2 | | 4/2007 | Lundgren et al. |
| 7,229,249 B2 | | 6/2007 | Durocher et al. |
| 7,238,008 B2 | | 7/2007 | Bobo et al. |
| 7,367,567 B2 | | 5/2008 | Farah et al. |
| 7,371,044 B2 | | 5/2008 | Nereim |
| 7,389,583 B2 | | 6/2008 | Lundgren |
| 7,614,150 B2 | | 11/2009 | Lundgren |
| 7,631,879 B2 | | 12/2009 | Diantonio |
| 7,673,461 B2 | | 3/2010 | Cameriano et al. |
| 7,677,047 B2 | | 3/2010 | Somanath et al. |
| 7,735,833 B2 | | 6/2010 | Braun et al. |
| 7,798,768 B2 | | 9/2010 | Strain et al. |
| 7,815,417 B2 | | 10/2010 | Somanath et al. |
| 7,824,152 B2 | | 11/2010 | Morrison |
| 7,891,165 B2 | | 2/2011 | Bader et al. |
| 7,909,573 B2 | | 3/2011 | Cameriano et al. |
| 7,955,446 B2 | | 6/2011 | Dierberger |
| 7,959,409 B2 | | 6/2011 | Guo et al. |
| 7,988,799 B2 | | 8/2011 | Dierberger |
| 8,069,648 B2 | | 12/2011 | Snyder et al. |
| 8,083,465 B2 | | 12/2011 | Herbst et al. |
| 8,091,371 B2 | | 1/2012 | Durocher et al. |
| 8,092,161 B2 | | 1/2012 | Cai et al. |
| 8,152,451 B2 | | 4/2012 | Manteiga et al. |
| 8,162,593 B2 | | 4/2012 | Guimbard et al. |
| 8,172,526 B2 | | 5/2012 | Lescure et al. |
| 8,177,488 B2 | | 5/2012 | Manteiga et al. |
| 8,221,071 B2 | | 7/2012 | Wojno et al. |
| 8,245,399 B2 | | 8/2012 | Anantharaman et al. |
| 8,245,518 B2 | | 8/2012 | Durocher et al. |
| 8,282,342 B2 | | 10/2012 | Tonks et al. |
| 8,371,127 B2 | | 2/2013 | Durocher et al. |
| 8,371,812 B2 | | 2/2013 | Manteiga et al. |
| 2003/0025274 A1 | | 2/2003 | Allan et al. |
| 2003/0042682 A1 | | 3/2003 | Inoue |
| 2003/0062684 A1 | | 4/2003 | Inoue |
| 2003/0062685 A1 | | 4/2003 | Inoue |
| 2005/0046113 A1 | | 3/2005 | Inoue |
| 2006/0010852 A1 | | 1/2006 | Gekht et al. |
| 2008/0216300 A1 | | 9/2008 | Anderson et al. |
| 2009/0155069 A1 | | 6/2009 | Durocher et al. |
| 2010/0095678 A1 | | 4/2010 | Hawie et al. |
| 2010/0132371 A1 | | 6/2010 | Durocher et al. |
| 2010/0132374 A1 | | 6/2010 | Manteiga et al. |
| 2010/0132377 A1 | | 6/2010 | Durocher et al. |
| 2010/0202872 A1 | | 8/2010 | Weidmann |
| 2010/0236244 A1 | | 9/2010 | Longardner |
| 2010/0275572 A1 | | 11/2010 | Durocher et al. |
| 2010/0275614 A1 | | 11/2010 | Fontaine et al. |
| 2010/0307165 A1 | | 12/2010 | Wong et al. |
| 2011/0000223 A1 | | 1/2011 | Russberg |
| 2011/0005234 A1 | | 1/2011 | Hashimoto et al. |
| 2011/0061767 A1 | | 3/2011 | Vontell et al. |
| 2011/0081239 A1 | | 4/2011 | Durocher |
| 2011/0081240 A1 | | 4/2011 | Durocher et al. |

(56) References Cited

U.S. PATENT DOCUMENTS

| | | |
|---|---|---|
| 2011/0085895 A1 | 4/2011 | Durocher et al. |
| 2011/0214433 A1 | 9/2011 | Feindel et al. |
| 2011/0262277 A1 | 10/2011 | Sjoqvist et al. |
| 2011/0302929 A1 | 12/2011 | Bruhwiler |
| 2012/0111023 A1 | 5/2012 | Sjoqvist et al. |
| 2012/0156020 A1 | 6/2012 | Kottilingam et al. |
| 2012/0186254 A1 | 7/2012 | Ito et al. |
| 2012/0204569 A1 | 8/2012 | Schubert |
| 2013/0011242 A1 | 1/2013 | Beeck et al. |

FOREIGN PATENT DOCUMENTS

| | | |
|---|---|---|
| WO | WO 2009/157817 A1 | 12/2009 |
| WO | WO 2010/002295 A1 | 1/2010 |
| WO | WO 2012/158070 A1 | 11/2012 |

* cited by examiner

MOUNT WITH DEFLECTABLE TABS

BACKGROUND

The disclosure relates to gas turbine engines, and more particularly to mounts used in gas turbine engines.

Gas turbine engines operate according to a continuous-flow, Brayton cycle. A compressor section pressurizes an ambient air stream, fuel is added and the mixture is burned in a central combustor section. The combustion products expand through a turbine section where bladed rotors convert thermal energy from the combustion products into mechanical energy for rotating one or more centrally mounted shafts. The shafts, in turn, drive the forward compressor section, thus continuing the cycle. Gas turbine engines are compact and powerful power plants, making them suitable for powering aircraft, heavy equipment, ships and electrical power generators. In power generating applications, the combustion products can also drive a separate power turbine attached to an electrical generator.

For many stator vane assemblies, a fairing is disposed about a structured frame and defines a main gas flow path for the gas turbine engine. As the fairing is directly exposed to gas flow, including combustion gases, the fairing can be heated to high temperatures during operation. Heat shields can be used to reduce radiant heat transfer from the fairing to the frame. The fairing and heat shield experience movement relative to the frame due to temperature and pressure fluctuations during engine operation. Typical mounting schemes for the fairing and/or heat shield can heat the frame in an undesirable manner via conductive heat transfer. Additionally, these mounting schemes can over-constrain the heat shield and/or fairing relative to the frame.

SUMMARY

An assembly for a gas turbine engine includes a first component, a second component, and a first mount. The first mount includes an annular body that is connected to the first component and a plurality of circumferentially spaced tabs extending from the body. The tabs are connected to the second component and are deflectable to allow the second component to move relative to the first component.

A gas turbine engine includes a casing, a heat shield, and a flexible mount. The heat shield is disposed adjacent the casing. The mount includes an annular body connected to the casing and a plurality of circumferentially spaced tabs extending from the body. The tabs are connected to the heat shield and are deflectable to allow the heat shield to move relative to the casing.

A method includes connecting a first mount having a plurality of circumferentially spaced tabs to a casing, and attaching a heat shield to the tabs. The tabs are deflectable to allow the heat shield to move relative to the casing.

DETAILED DESCRIPTION

This application discloses a mount with circumferentially spaced tabs. A heat shield, fairing and/or other component can be attached to the tabs by welding, brazing, riveting, or other form of connection. The tabs are deflectable (i.e. they act as springs) to provide the heat shield, fairing, and/or other components with the freedom to move axially and radially with respect to a frame while maintaining the circumferential location of the heat shield relative to the frame. The mount improves the operational life of the heat shield and/or fairing by reducing creep cracking. The mount also reduces thermal conduction from the heat shield and/or fairing into the frame. This allows less expensive materials to be used for the frame. Additionally, the mount does not over-constrain the heat shield, reduces part count and engine weight, and can be used to dampen vibration of the heat shield or other components.

Figure 1:
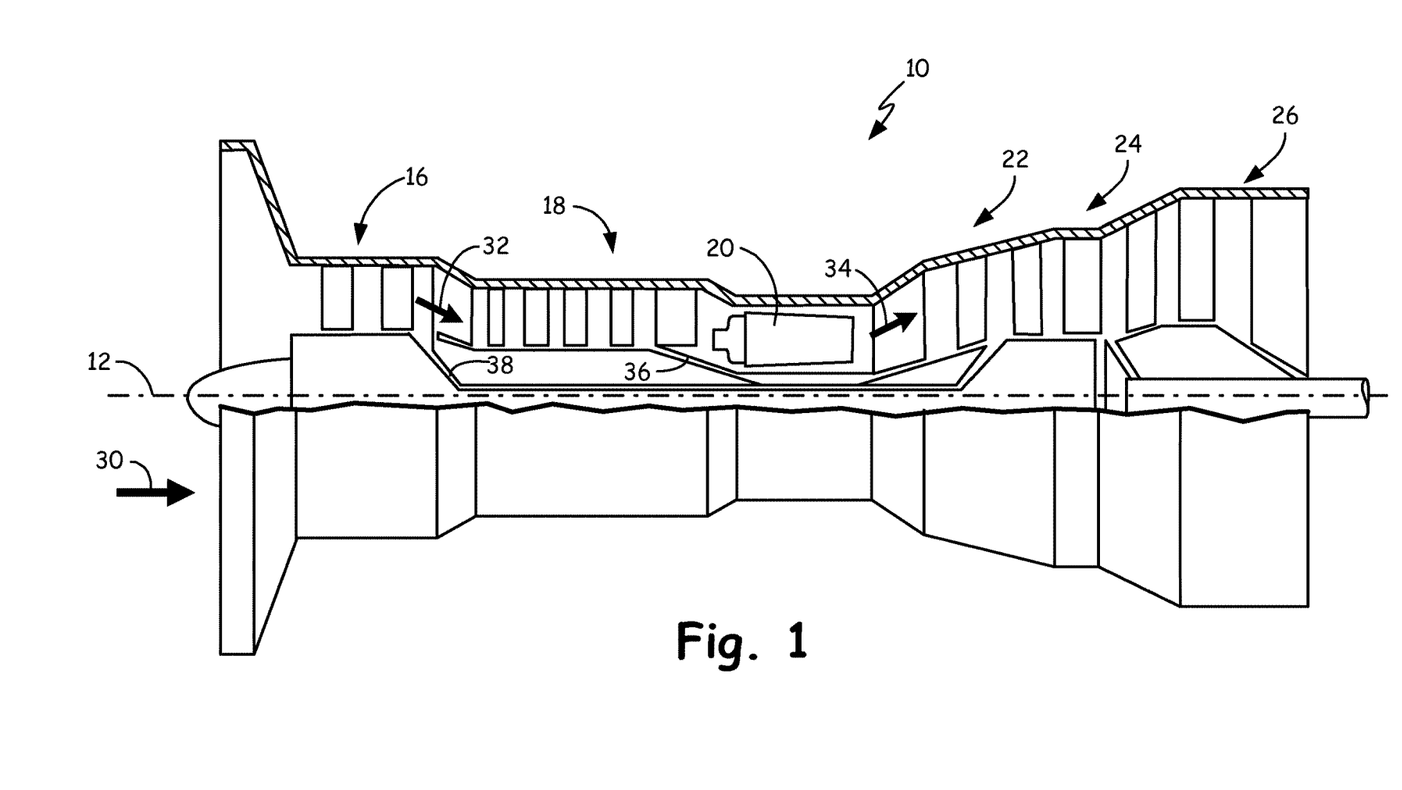
FIG. 1 is an industrial turbine cross-section.

An exemplary industrial gas turbine engine 10 is circumferentially disposed about a central, longitudinal axis or axial engine centerline axis 12 as illustrated in FIG. 1. The engine 10 includes, in series order from front to rear, low and high pressure compressor sections 16 and 18, central combustor section 20 and high and low pressure turbine sections 22 and 24. In some examples, free turbine section 26 is disposed aft of low pressure turbine 24. While described in reference to an industrial gas turbine engine, the concepts described herein extend to aero engines with a fan or gear driven fan, and engines with more or fewer sections than illustrated.

In gas turbines, incoming ambient air 30 becomes pressurized air 32 in compressors 16 and 18. Fuel mixes with the pressurized air 32 in combustor section 20, where it is burned to produce combustion gases 34 that expand as they flow through turbine sections 22, 24 and power turbine 26. Turbine sections 22 and 24 drive high and low pressure rotor shafts 36 and 38 respectively, which rotate in response to the combustion products and thus the attached compressor sections 18, 16. Free turbine section 26 may, for example, drive an electrical generator, pump, or gearbox (not shown).

It is understood that FIG. 1 provides a basic understanding and overview of the various sections and the basic operation of an industrial gas turbine engine. The present application is applicable to all types of gas turbine engines, including those with aerospace applications.

Figure 2:
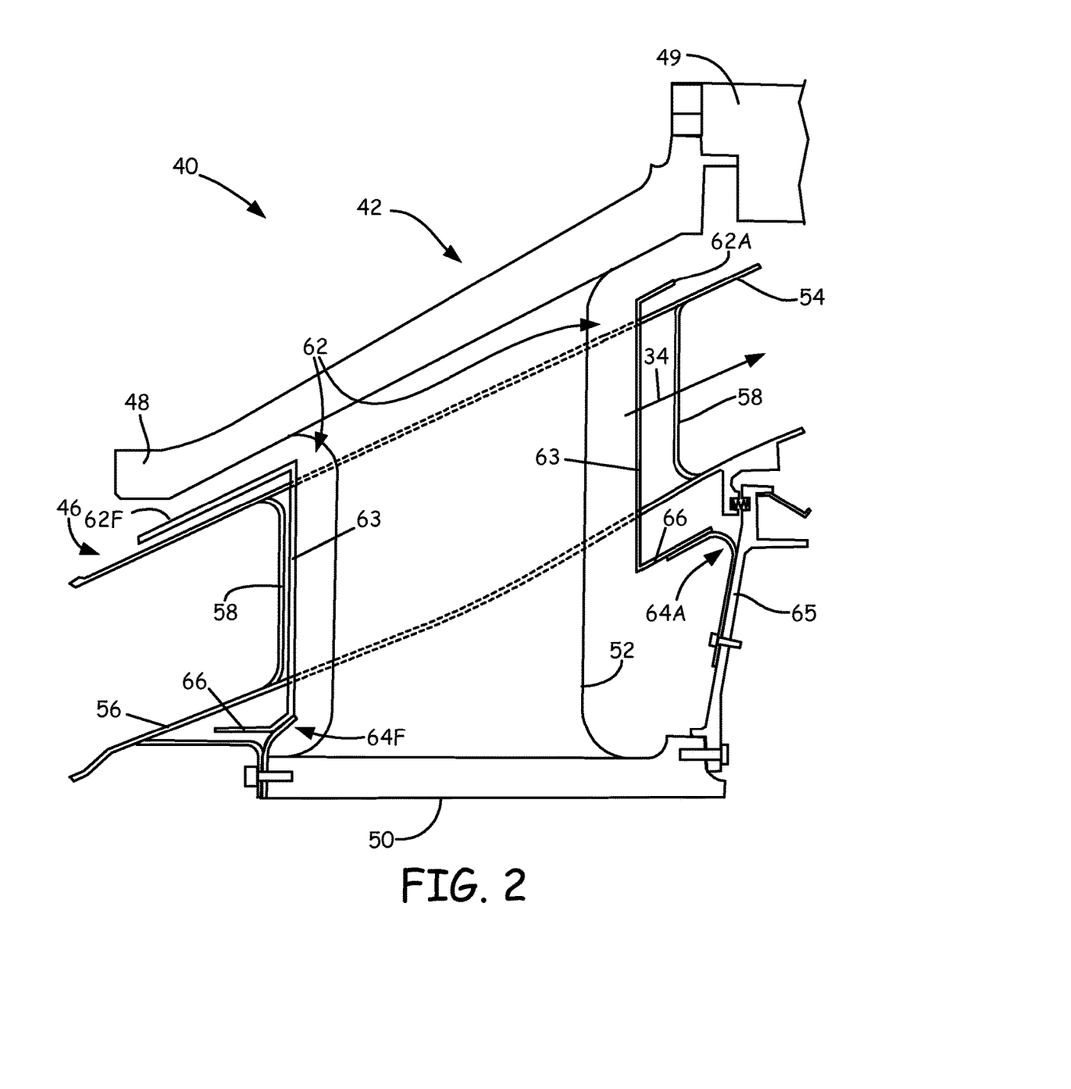
FIG. 2 is a cross-section of an assembly including a frame, a fairing, forward and aft mounts, and a heat shield arranged together.

FIG. 2 shows a cross-section of assembly 40 with heat shield 62 installed between frame 42 and fairing 46. Assembly 40 includes frame 42, heat shield 62, first mount 64F, second mount 64A, and fairing 46. Frame 42 includes outer radial casing 48, inner radial casing 50, struts 52, and seal support 65. Fairing 46 includes outer radial platform 54, inner radial platform 56, and strut liners 58. Heat shield 62 includes forward shield 62F, aft shield 62A, strut shields 63, and flanges 66.

First mount 64F is disposed at a forward end of frame 42 and is attached to inner radial casing 50 by fasteners. Second mount 64A is spaced from first mount 64F and is disposed adjacent the aft end of frame 42 and heat shield 62. In the embodiment shown in FIG. 2, second mount 64A is connected to seal support 65. First and second mounts 64F and 64A are curved to extend both radially and axially with respect to engine centerline axis 12, and are adapted to connect to and support heat shield 62 relative to frame 42 and fairing 46. In particular, first mount 64F and second mount 64A are flexible and can flex or deflect to provide heat shield 62 with the freedom to move axially and radially relative to frame 42 while maintaining the circumferential location of heat shield 62 relative to frame 42. In other embodiments, the connection between first and second mounts 64F and 64A and frame 42 can be accomplished by welding, riveting, brazing, bolting, or other forms of connection.

Frame 42 comprises a stator component of gas turbine engine 10 (FIG. 1) and can form portions of compressor sections 16 and 18 or turbine sections 22 and 24. Heat shield 62 and fairing 46 are shown installed within frame 42 in FIG. 2. Both heat shield 62 and fairing 46 are connected to frame 42. In FIG. 2, heat shield 62 is connected to frame 42 by first mount 64F and second mount 64A. Fairing 46 is disposed within frame 42 to form the main gas flow path for a portion of gas turbine engine 10. It should be understood that the embodiments of first mount 64F and second mount 64A are provided in relation to a specific embodiment that supports heat shield 62 relative to frame 42, but mounts 64F and 64A described are applicable to supporting other gas turbine sections and elements including stator vane components such as fairing 46.

As illustrated in FIG. 2, outer radial casing 48 of frame 42 is conically shaped and forms a portion of the casing of gas turbine engine 10 (FIG. 1), for example, in low pressure turbine section 24. Outer radial casing 48 abuts and is connected to second outer radial casing 49 of another module of gas turbine engine 10. Inner radial casing 50 is disposed generally radially inward of outer radial casing 48 and is connected thereto by struts 52 (only one is shown in FIG. 2).

Fairing 46 is adapted to be disposed within frame 42 between outer radial casing 48 and inner radial casing 50. Outer radial platform 54 of fairing 46 has a generally conical shape. Similarly, inner radial platform 56 has a generally conical shape. Inner radial platform 56 is spaced from outer radial platform 54 by strut liners 58. Strut liners 58 are adapted to be disposed around struts 52 of frame 42 as well as strut shields 63 of heat shield 62 when fairing 46 is assembled on frame 42 as illustrated in FIG. 2. As discussed previously, outer radial platform 54, inner radial platform 56, and strut liners 58, form the main gas flow path, which directs combustion gases 34 through the portion of gas turbine engine illustrated in FIG. 2.

Heat shield 62 is disposed between frame 42 and fairing 46. Strut shields 63 extend about struts 52 and are disposed between struts 52 and strut liners 58. Strut shields 63 extend from forward shield 62F and aft shield 62A. Each strut shield 63 can initially be divided for installation around struts 52 and then welded, riveted, brazed, or otherwise connected to forward shield 62F and aft shield 62A. Forward shield 62F and aft shield 62A are disposed between outer radial platform 54 and outer radial casing 48.

Each strut shield 63 extends generally radially inward from forward shield 62F and aft shield 62A. As illustrated in the embodiment of FIG. 2, the inner radial portion of each strut shield 63 is adapted as flange 66. Flanges 66 extend forward and aft of strut liner 63. Flanges 66 is adapted to interface with and connect to first mount 64F and second mount 64A. This connection can be accomplished by welding, riveting, brazing, bolting, or other type of connection. In the embodiment of FIG. 2, flanges 66 are connected to first mount 64F and second mount 64A by welding.

In addition to providing heat shield 62 with the freedom to move axially and radially relative to frame 42, attachment of heat shield 62 to frame 42 via first mount 64F and second mount 64A is desirable as it allows heat shield 62 to be attached to a cooler component such as frame 42 rather then fairing 46. Using first mount 64F and second mount 64A to support heat shield 62, therefore, reduces conductive heat transfer from the heat shield 62 into frame 42.

In the embodiment shown in FIG. 2, strut shield 63, forward shield 62F, aft shield 62A, and flanges 66 are connected to one another by welding, riveting, brazing, or other methods of joining. In the embodiment shown in FIG. 2, strut shield 63, forward shield 62F, aft shield 62A, and flanges 66 are supported by first and second mounts 64F and 64A. In other embodiments, strut shield 63, forward shield 62F, aft shield 62A, and flanges 66 can comprise single or separate components, can be segmented, and/or can comprise subassemblies of several components. Additionally, in other embodiments, one or more components of heat shield 62 such as strut shield 63, forward shield 62F, aft shield 62A, and flanges 66 may not be connected together but instead are disposed with gaps therebetween. In yet other embodiments, one or more components of heat shield 62 such as strut shield 63, aft shield 62A, and/or forward shield 62F can be connected to and/or supported from other portions of frame 42 in addition to being supported by first mount 64F and second mount 64A. First mount 64F and second mount 64A may connect to other components such as outer radial casing 48.

First mount 64F and second mount 64A both comprise annular rings having a plurality of radially and axially extending tabs. One embodiment of first mount 64F is discussed in further detail with reference to FIGS. 3A-3C, however, the concepts and configurations discussed are equally applicable to aft mount 64A and other embodiments of mount not specifically described in reference to the FIGURES.

Figure 3A:
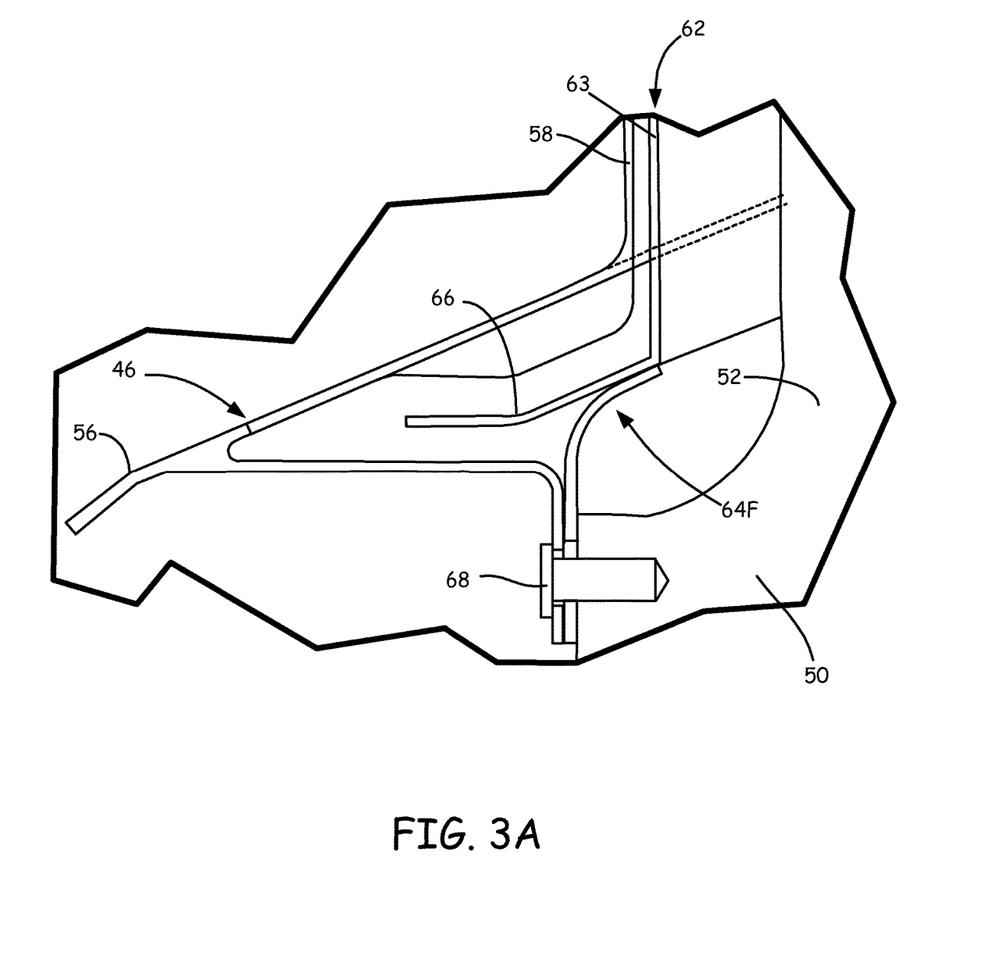
FIG. 3A is an enlarged view of one embodiment of the forward mount from FIG. 2 attached to a forward portion of the heat shield.
Figure 3B:
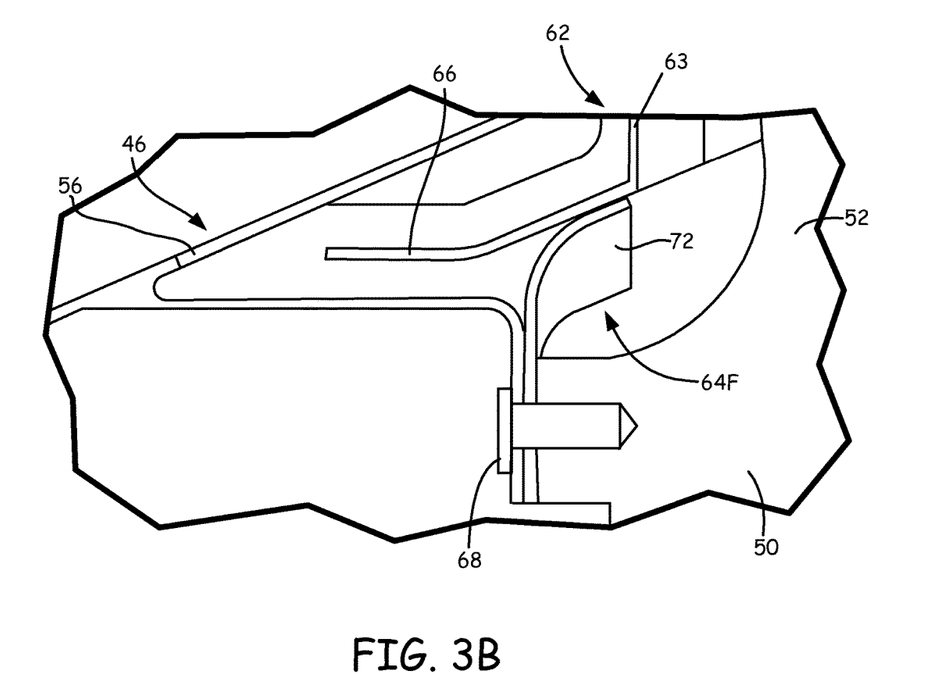
FIG. 3B is a perspective view of a portion of the forward mount and heat shield of FIG. 3A, showing a tab of the mount.

FIGS. 3A and 3B are enlarged views of the embodiment of first mount 64F of FIG. 2. In FIGS. 3A and 3B, first mount 64F is connected to inner radial casing 50 by bolts 68. First mount 64F extends initially generally radially from inner radial casing 50 and then extends both axially and radially aft toward struts 52 along an extent of tab 72 (FIG. 3B). Flange 66 extends axially forward from strut shield 63. Flange 66 is connected to first mount 64F at tabs 72 (FIGS. 3B and 3C) via any conventional method, and extends between inner radial platform 56 of fairing 46 and inner casing 50. First mount 64F allows for movement due to deflection of heat shield 62 in both a radial and an axial direction relative to inner radial casing 50, while preventing circumferential movement of heat shield 62 relative to inner radial casing 50.

Figure 3C:
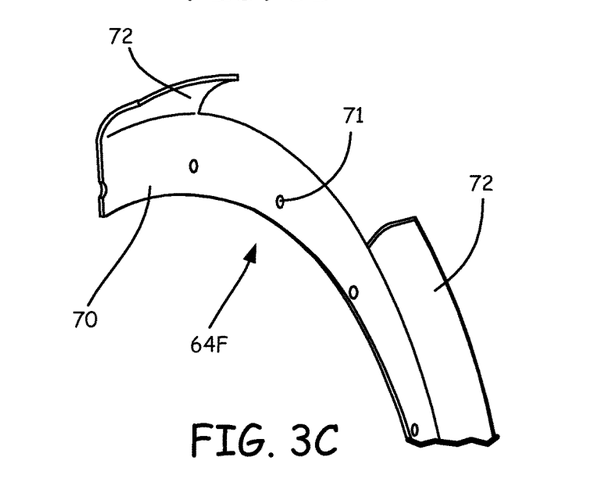
FIG. 3C is a perspective view of a portion of the forward mount of FIG. 3A illustrating that the forward mount includes a ring and tabs.

FIGS. 3B and 3C illustrate features of one embodiment of first mount 64F. FIG. 3C shows a portion of first mount 64F. First mount 64F includes an annular body 70 that is adapted to interface with and mount to inner radial casing 50. In particular, annular body 70 comprises a full 360° ring and includes apertures 71 (FIG. 3C) that receive bolts 68 (FIG. 3B) therein.

Flexible tabs 72 extend from annular body 70. Tabs 72 are curved to extend both radially and axially while annular body 70 extends generally radially. As illustrated in FIG. 3C, tabs 72 are spaced from one another in a circumferential direction along the circumferential extent of annular body 70. In the embodiment disclosed, annular body 70 comprises a flat ring-like body, as such annular body 70 takes on a crenulated or castellated shape with tabs 72. The outer radial surface of tabs 72 interface with and are connected to flange 66 of heat shield 66. This connection can be accomplished by welding, riveting, brazing, bolting, or other type of connection. Tabs 72 are flexible (i.e. they deflect to act as springs) to provide heat shield 62 (and in other embodiments fairing 46 or other components) with the freedom to move axially and radially relative to inner radial casing 50 and other components of frame 42 (FIG. 2) while maintaining the circumferential location of heat shield 46 relative to frame 42. In one embodiment, first mount 64F is formed from thin metal such as a sheet metal comprised of a nickel alloy. In other embodiments forward mount 64F can be segmented into separate components rather than comprise a full ring-like body. The number of tabs 72, the circumferential, radial, and axial dimensions of tabs 72, the material used for first mount 64F, and the thickness of tabs 72 and annular body 70 will vary from embodiment to embodiment and can be determined with the aid of analytical software.

This application discloses a mount with circumferentially spaced tabs. A heat shield, fairing and/or other component can be attached to the tabs by welding, brazing, riveting, or other form of connection. The tabs are deflectable (i.e. they act as springs) to provide the heat shield, fairing, and/or other components with the freedom to move axially and radially with respect to a frame while maintaining the circumferential location of the heat shield relative to the frame. The mount improves the operational life of the heat shield and/or fairing by reducing creep cracking. The mount also reduces thermal conduction from the heat shield and/or fairing into the frame. This allows less expensive materials to be used for the frame. Additionally, the mount does not over-constrain the heat shield, reduces part count and engine weight, and can be used to dampen vibration of the heat shield or other components.

Discussion of Possible Embodiments

The following are non-exclusive descriptions of possible embodiments of the present invention.

An assembly for a gas turbine engine includes a first component, a second component, and a first mount. The first mount includes an annular body that is connected to the first component and a plurality of circumferentially spaced tabs extending from the body. The tabs are connected to the second component and are deflectable to allow the second component to move relative to the first component.

The assembly of the preceding paragraph can optionally include, additionally and/or alternatively, any one or more of the following features, configurations and/or additional components:

the first component comprises a casing;
the casing comprises an inner radial casing of a turbine frame;
the second component comprises a heat shield;
the first mount allows for movement of the heat shield in both a radial and an axial direction relative to the casing while preventing circumferential movement of the heat shield relative to the casing;
the casing comprises a seal support;
the annular body comprises a ring;
the annular body and tabs are formed of a sheet metal;
the tabs are curved and extend both axially and radially with respect to a centerline axis of the gas turbine engine;
a third component connected to the first component, and a second mount spaced axially from the first mount, the second mount including an annular body connected to the third component and a plurality of circumferentially spaced tabs extending from the body, the tabs are connected to the second component and are deflectable to allow the second component to move relative to the third component; and
the first mount and the second mount allow for movement of the second component in both a radial and an axial direction relative to the first component and third component while preventing circumferential movement of the second component relative to the first component and third component.

A gas turbine engine includes a casing, a heat shield, and a flexible mount. The heat shield is disposed adjacent the casing. The mount includes an annular body connected to the casing and a plurality of circumferentially spaced tabs extending from the body. The tabs are connected to the heat shield and are deflectable to allow the heat shield to move relative to the casing.

The gas turbine of the preceding paragraph can optionally include, additionally and/or alternatively, any one or more of the following features, configurations and/or additional components:

the casing comprises an inner radial casing of a turbine frame;
the tabs extend rearward relative to the casing and are curved to have both axial and radial extent;
the first mount allows for movement of the heat shield in both a radial and an axial direction relative to the casing while preventing circumferential movement of the heat shield relative to the casing;
the casing includes a seal support and the mount is connected to the seal support;
a second mount spaced axially from the first mount, the second mount including an annular body and a plurality of circumferentially spaced tabs extending from the body, the tabs are adapted to connect to the heat shield and are deflectable to allow the heat shield to move relative to the casing; and
the first mount and the second mount allow for movement of the heat shield in both a radial and an axial direction relative to the casing while preventing circumferential movement of the heat shield relative to the heat shield.

A method includes connecting a first mount having a plurality of circumferentially spaced tabs to a casing, and attaching a heat shield to the tabs. The tabs are deflectable to allow the heat shield to move relative to the casing.

The method of the preceding paragraph can optionally include, additionally and/or alternatively, any one or more of the following features, configurations and/or additional components:

attaching the heat shield to a second mount, a circumferentially spaced tabs of the second mount are deflectable to allow the heat shield to move relative to the casing While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. An assembly comprising:
a first component of a gas turbine engine;
a second component of a gas turbine engine; and a first mount including a first annular body connected to the first component and a plurality of circumferentially spaced first tabs extending from the first annular body, wherein the first tabs are connected to the second component and are deflectable to allow the second component to move relative to the first component, wherein the first mount allows for movement of the second component in both a radial and an axial direction relative to the first component while preventing circumferential movement of the second component relative to the first component.

2. The assembly of claim 1, wherein the first component comprises a casing.

3. The assembly of claim 2, wherein the casing comprises an inner radial casing of a turbine frame.

4. The assembly of claim 2, wherein the second component comprises a heat shield.

5. The assembly of claim 2, wherein the casing comprises a seal support.

6. The assembly of claim 1, wherein the first annular body comprises a ring.

7. The assembly of claim 1, wherein the first annular body and the first tabs are formed of a sheet metal.

8. The assembly of claim 1, wherein the first tabs are curved and extend both axially and radially with respect to a centerline axis of the gas turbine engine.

9. The assembly of claim 1, further comprising:
a third component connected to the first component; and
a second mount spaced axially from the first mount, the second mount including a second annular body connected to the third component and a plurality of circumferentially spaced second tabs extending from the second annular body, wherein the second tabs are connected to the second component and are deflectable to allow the second component to move relative to the third component.

10. The assembly of claim 9, wherein the first mount and the second mount allow for movement of the second component in both a radial and an axial direction relative to the first component and third component while preventing circumferential movement of the second component relative to the first component and third component.

11. The gas turbine engine of claim 9, wherein the first mount and the second mount allow for movement of the heat shield in both a radial and an axial direction relative to the casing while preventing circumferential movement of the heat shield relative to the heat shield.

12. A gas turbine engine comprising:
a casing;
a heat shield disposed adjacent the casing;
a flexible first mount including a first annular body connected to the casing and a plurality of circumferentially spaced first tabs extending from the first annular body, wherein the first tabs are connected to the heat shield and are deflectable to allow the heat shield to move relative to the casing; and
a second mount spaced axially from the first mount, the second mount including a second annular body connected to the casing and a plurality of circumferentially-spaced, axially-forward-curved second tabs extending from the second annular body, wherein the second tabs are adapted to connect to the heat shield and are deflectable to allow the heat shield to move relative to the casing.

13. The gas turbine engine of claim 12, wherein the casing comprises an inner radial casing of a turbine frame.

14. The gas turbine engine of claim 12, wherein the first tabs extend rearward relative to the casing and are curved to have both axial and radial extent.

15. The gas turbine engine of claim 14, wherein the first mount allows for movement of the heat shield in both a radial and an axial direction relative to the casing while preventing circumferential movement of the heat shield relative to the casing.

16. The gas turbine engine of claim 12, wherein the casing includes a seal support and the mount is connected to the seal support.

17. A method comprising:
connecting a first mount to a casing, wherein a plurality of circumferentially spaced first tabs extends from an annular body of the first mount; and
attaching a heat shield to the first tabs, wherein the first tabs are deflectable to allow the heat shield to move relative to the casing, and wherein the first mount allows for movement of the heat shield in both a radial and an axial direction relative to the casing while preventing circumferential movement of the heat shield relative to the casing.

18. The method of claim 17, further comprising:
attaching the heat shield to a second mount, wherein a circumferentially spaced second tabs of the second mount are deflectable to allow the heat shield to move relative to the casing.

* * * * *